June 17, 1930.  J. M. CRAIGO  1,764,067
ORTHODONTIC APPLIANCE
Filed March 15, 1928

Inventor
John M. Craigo
By T. Clay Lindsey
His Attorney

Patented June 17, 1930

1,764,067

UNITED STATES PATENT OFFICE

JOHN M. CRAIGO, OF HARTFORD, CONNECTICUT, ASSIGNOR TO EDWARD HAROLD ROWAN, OF NEW YORK, N. Y.

ORTHODONTIC APPLIANCE

Application filed March 15, 1928. Serial No. 262,007.

This invention relates to removable orthodontic appliances, and refers more particularly to improvements in orthodontia or regulating appliances.

The aim of the invention is to provide a removable orthodontic appliance of this sort having various features of novelty and advantage and which is relatively small and compact, which is relatively comfortable, which is simple but strong, which may be easily and quickly secured in place and removed from the mouth, which, when applied in the mouth, is securely and positively held against rotating, tilting or accidental removal, and by means of which the arch, forming a part of the appliance, may be held in close proximity to the gum, the place where it is most effective in certain appliances.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, two embodiments which the present invention may take:

Figure 1:
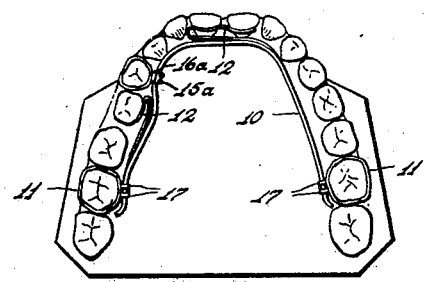
Figure 1 is a plan view of a set of teeth to which my improved orthodontic appliance is applied.

In the accompanying drawings, I have shown the invention as used in connection with an interior or lingual arch, but obviously the invention is not limited to this particular application. My improvements may be used in connection with an exterior or labial arch or other orthodontic element. The arch may be of any suitable construction, that shown in the drawing being by way of illustration only. It is designated by the numeral 10. The numerals 11 designate bands which are mounted about the teeth of the mouth in the usual manner. In the present instance, the orthodontic appliance is shown as being employed for straightening certain of the teeth and, to this end, the arch is provided with springs or fingers 12 which are so shaped and located as to properly engage, preferably adjacent the gum, those teeth which are to be straightened or brought into alignment with respect to other teeth.

In accordance with the present invention, an improved arrangement is provided whereby the arch may be removably and effectively connected to the bands. In the embodiment shown in Figs. 2 to 5, the band is provided with a curved extension or hooked portion 15 which provides a curved seat in which the arch 10 is adapted to removably engage, as shown most clearly in Fig. 4. Upon the arch is a rotatable or turnable sleeve 16 provided with means adapted to interlock with the hooked portion 15 so as to prevent accidental displacement of the arch with respect to the band. In this embodiment, the sleeve is in the form of a pair of spaced rings 17 connected together by a bridge portion 18. The ring portions 17 are spaced apart a distance substantially equal that of the width of the hooked portion 15, and the bridge 18 is spaced outwardly from the arch a sufficient distance to receive the hook. The sleeve is provided with an ear 19 which preferably extends outwardly from one edge of the bridge.

Figure 3:
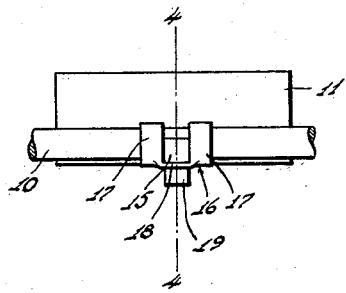
Fig. 3 is a detailed elevational view showing the arch secured to the band.
Figure 2:
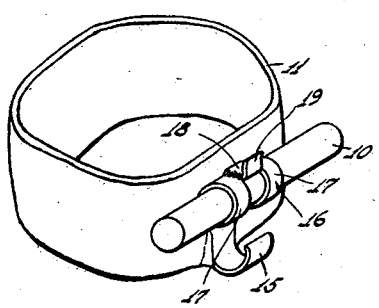
Fig. 2 is a perspective view showing a band, a part of the arch and the means for securing the arch and band together.
Figure 4:
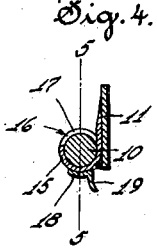
Fig. 4 is a sectional view taken substantially on line 4—4 of Fig. 3.
Figure 5:
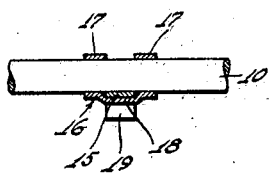
Fig. 5 is a longitudinal sectional view taken substantially on line 5—5 of Fig. 4, the arch being shown in elevation.
Figure 7:
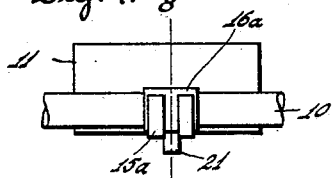
Fig. 7 is a view similar to Fig. 3, but showing the embodiment of Fig. 6.
Figure 8:
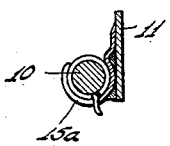
Fig. 8 is a sectional view taken on line 8—8 of Fig. 7.

It will be seen that, with the embodiment shown in Figs. 2 to 5, to secure the arch in place, it is brought to the position shown in Fig. 2 with the sleeve turned up as illustrated in that figure, and then the arch is lowered so as to engage the hook between the rings, and then the sleeve is turned to the position shown in Figs. 3, 4 and 5. In this condition, the parts are securely locked together. The arch is held against lateral movement by the hook and is held against vertical movement off of the hook by the bridge. It will be observed that the arch may be very easily and quickly secured in place. To remove the arch, as, for instance, when it is desired to clean the orthodontic appliance, it is merely necessary for the dentist to engage the tongue 19 with a tool and then turn the sleeve to the position shown in Fig. 2 and then lift the arch out of the mouth.

In the embodiment shown in Figs. 6 to 9, inclusive, the hook 15$^a$ is shown as being bifurcated, that is, it is slotted as at 20. The sleeve 16$^a$ is provided with a tongue 21. The hook portion 15$^a$ provides a circular seat which, by preference, is greater than 180° or a half circle, thus making it necessary to longitudinally move the sleeve into the seat instead of dropping it into the seat. The sleeve 16$^a$ is adapted to slide longitudinally on the arch.

Figure 9:
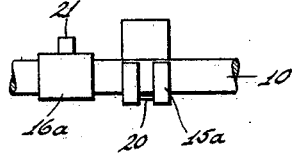
Fig. 9 is a side elevational view showing the parts of the securing means of the embodiment shown in Figs. 6 and 7 disengaged.
Figure 6:
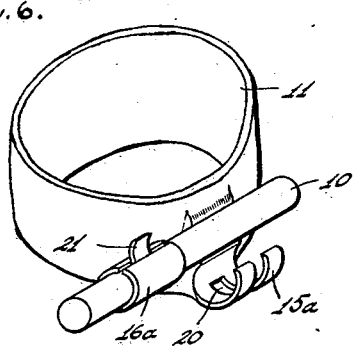
Fig. 6 is a view similar to Fig. 2, but showing another form of the invention.

To secure the arch in position, where the embodiment shown in Figs. 6 to 9 is employed, the sleeve 16$^a$ may be moved to the position shown in Fig. 6, the arch lowered so as to engage in the seat of the hook 15$^a$, as shown in Fig. 9, and then the sleeve moved longitudinally to position where it engages in the seat. Then the projection or ear 21 is engaged by a tool, and the sleeve is turned to the position shown in Figs. 7 and 8 and in which position the ear 21 engages in the slot 20. To remove the arch, the operations are reversed. Obviously, any suitable means may, if found necessary, be employed to prevent the member 10 from slipping with respect to the sleeves 16 and 16$^a$, and to this end, the rod or part 10 may be roughened.

From the foregoing description, taken in connection with the accompanying drawings, it will be observed that a very economic and simplified construction is provided. The parts are relatively simple and compact so that the structure, when in the mouth, is relatively more comfortable than similar structures as heretofore made. The arch is securely and positively held in correct position within the mouth, and the orthodontic appliance may be very easily and quickly positioned in and removed from place, thus facilitating frequent cleaning of the orthodontic appliance.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a removable orthodontic appliance, a hooked member adapted to be connected to a tooth and providing a seat, an orthodontic element adapted to be received in the seat of said hooked member, and rotatable means on said element adapted to interlock with said member, said means being rotatable within said seat.

2. In a removable orthodontic appliance, a hooked member adapted to be connected to a tooth and forming a seat, an orthodontic element adapted to be received in the seat of said member, and a turnable sleeve on said element and having means adapted to interlock with said hooked member to secure said element thereto, said sleeve being turnable in said seat.

3. In a removable orthodontic appliance, a hooked member adapted to be connected to a tooth and providing a seat, an arch element adapted to fit in said seat, and a sleeve longitudinally movable on said arch element and having a portion adapted to interlock with said hooked member said sleeve being rotatable in said seat.

4. In a removable orthodontic appliance, a hooked member adapted to be connected to a tooth, an orthodontic element adapted to be received by said hooked member, and a sleeve turnable on said orthodontic element and having a bridge portion adapted to receive said hooked member.

5. In a removable orthodontic appliance, a band, a hook thereon, an arch, and a sleeve-like member turnable on said arch and having a pair of spaced rings adapted to straddle said hook and an arch portion adapted to receive said hook.

6. In a removable orthodontic appliance, a band, a hook thereon, an arch, and a sleeve-like member turnable on said arch and having a pair of spaced rings adapted to straddle said hook and an arch portion adapted to receive said hook, said sleeve-like member also having a projecting ear adapted to be engaged by a tool.

JOHN M. CRAIGO.